Sept. 3, 1940.  G. E. G. VON STIETZ  2,213,808
PROCESS AND APPARATUS FOR CLARIFYING LIQUIDS
Filed March 19, 1938
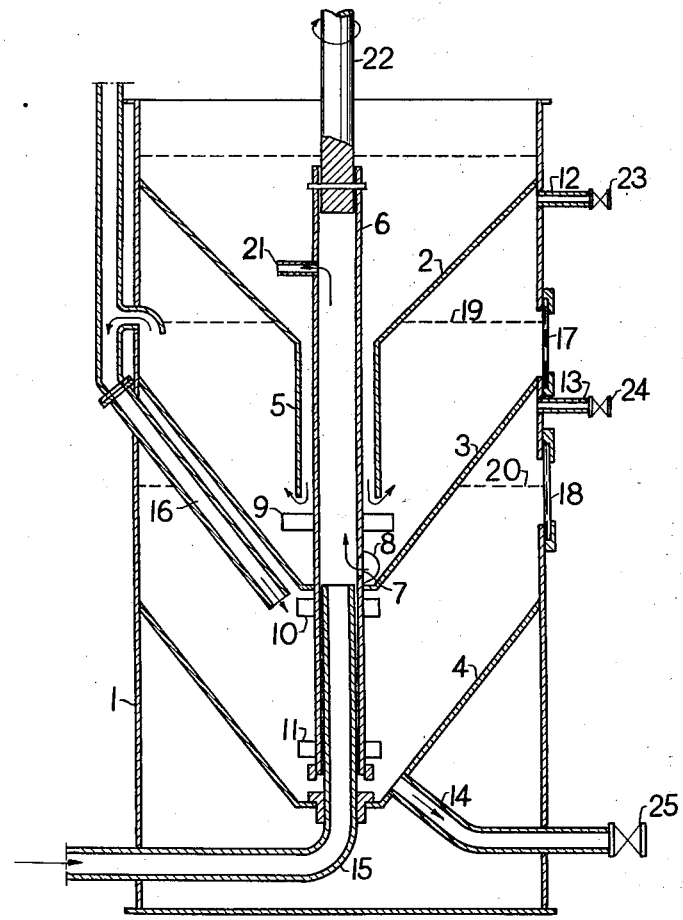
Inventor: George E. G. von Stietz
By his Attorney: Arthur B. Bakalar Patented Sept. 3, 1940

2,213,808

UNITED STATES PATENT OFFICE 2,213,808

PROCESS AND APPARATUS FOR CLARIFYING LIQUIDS

George E. G. von Stietz, Berkeley, Calif., assignor to Shell Development Company, San Francisco, Calif., a corporation of Delaware Application March 19, 1938, Serial No. 196,946

11 Claims. (Cl. 210—51)

The present invention relates to a process and apparatus for the clarification of liquids by the separation of suspended matter therefrom.

An object of the invention is to provide a new and improved method whereby finely divided solids may be separated commercially in a practical and efficient manner from suspensions thereof in liquids of lower density. Another object of the invention is to provide a method whereby oily, gummy, colloidal, mucilaginous and gelatinous material may be efficiently and economically removed from suspensions thereof in liquids. Still another object is to provide a process whereby sugar juices may be freed from undesirable gummy and colloidal materials and precipitated solids to yield a clarified juice of better clarity and quality. Yet another object is to provide apparatus and modifications thereof wherein the principles of the present method may be advantageously employed. Other objects and advantages will definitely appear in the following description.

The present process differs from prior art processes, among other respects, in that a condition of secondary settling is maintained while primary settling is substantially excluded.

The distinction that I make between primary and secondary settling may be illustrated as follows:

If a finely divided solid be suspended evenly in a liquid of lower density and the suspension allowed to stand undisturbed, the solid particles immediately begin to settle. As the settling progresses the upper portion becomes less and less murky and finally a definite layer of settled material is seen under the murky liquid. By observing the height of the sediment-liquid interface, it is found that the volume of the sediment layer increases to a maximum and then begins to decrease. This process, up to the attainment of the maximum volume of the settled layer, I designate as primary settling. The process taking place after the attainment of the maximum volume and during the shrinking of the settled layer, I designate as secondary settling.

During the process of secondary settling, the solid particles, being in close proximity, are mutually attracted by various forces with the result that the interstitial space is reduced. The liquid forced from the contracting interstitial space, in passing to the surface through the shrunken interstices, undergoes a thorough filtering action and is, consequently, under favorable conditions, of excellent clarity. In the present process, I utilize a continuously renewed column of sediment in a static condition of secondary settling as a filter bed which under suitable operating conditions retains solid particles, gelatinous oily, mucilaginous, and colloidal matter and yields a filtrate of excellent clarity and quality.

My process, broadly speaking, consists in continuously introducing a suspension to be separated at a definite, even rate, at, or near, the bottom of a column of sediment in a static condition of secondary settling, holding the level of the column of sediment acting as a filter bed substantially constant by continuously removing the excess sediment from a point near the upper surface of said layer and continuously removing sediment-free liquid collecting above the sediment layer. It is seen that in my process the liquid and solid matter move concurrently being introduced near the bottom in any particular stage and being separately withdrawn from more elevated points.

In order that a condition of secondary settling shall prevail, it is necessary that the solid particles be in sufficient proximity, that is, that the solid content of the sediment column acting as a filter be above a definite concentration. This concentration is the concentration of solids in the sediment layer at the point of maximum volume as above explained.

The extent of filtration and, hence, the clarity of the supernatant liquid is dependent upon the size of the interstitial passages in, and the height of the sediment column through which the liquid must pass. The degree of clarity may, therefore, be controlled by controlling either or both of these variables. The size and number of the interstitial spaces are a function of the degree or extent of the secondary settling and, therefore, of the concentration of solids in the sediment column, and this, in turn, is a function of the rate of feed of the incoming suspension. Therefore, in the present process the degree of clarity of the supernatant liquid is a function of the feed rate and may be adjusted and controlled thereby. As the feed rate is increased, the concentration of solids in the sediment column is decreased. This, in turn, lessens the extent or degree of secondary settling and by increasing the size of the interstitial passages decreases the filtering and clarifying action. If the feed rate be increased to the point where the concentration of solids in the sediment column falls below that necessary for secondary settling, the condition of secondary settling ceases to exist, a condition of primary settling is established, and the supernatant liquid becomes turbid.

The feed rate of the incoming suspension required to maintain the desired degree or state of secondary settling in the filter bed is dependent upon the concentration of solids in the feed and the rate at which the sediment undergoes secondary settling, i. e., the rate at which the sediment would undergo secondary settling if the incoming feed were stopped. Thus, certain very light sediments which undergo very slow secondary settling require correspondingly low feed rates and some very heavy sediments which undergo very rapid secondary settling require correspondingly high feed rates. These feed rates may be altered to a considerable extent by the addition to the suspension of various agents tending to modify the rate at which the sediment undergoes secondary settling. For example, by the addition of suitable weighting agents, such as barytes, galena, etc., the throughput capacity per unit area of sediment-clear liquid interface for a given column of sediment may be materially increased. Likewise, diatomaceous earth or other "filter aid" may often be added to the incoming suspension with advantage. These latter agents may or may not materially affect the rate of secondary settling, depending upon the circumstances.

Another factor affecting the throughput rate is the quantity and character of the suspended matter. Peculiarly enough, I have found my process to be most efficient when applied to the separation of suspensions which are ordinarily very difficult to separate by the usual filtration methods, and, conversely, least efficient when applied to some very easily filterable suspensions. For example, the presence of colloidal, gelatinous, gummy, or mucilaginous material in a suspension makes the separation by ordinary filtration means very difficult and often practically impossible. These materials, on the other hand, may be very efficiently removed by the present method and, indeed, their presence is often of distinct advantage.

I have found that numerous advantages can be realized by utilizing a bed of sediment in a static condition of secondary settling as a filtering medium. By controlling the stage or degree of secondary settling in the filter bed (i. e., the size of the interstitial passages) one may filter out matter of almost any desired fineness. Furthermore, since the lower portion of the filter bed is continually being renewed by fresh incoming solid matter there is a minimum tendency to clog the filter pores. This is important since by this method gelatinous and mucilaginous material may be completely removed without difficulty. The elimination of the use, replacement, and washing of filter cloths is likewise a distinct advantage.

Another advantage of the present process which makes it superior, for certain purposes, to the continuous filtration methods of the prior art is the uniform clarity of all portions of the clarified liquid obtained. In the usual, so-called continuous filtration processes the liquid to be filtered is passed through a filtering medium, usually a cloth or a screen, until the rate of flow falls below an arbitrary limit, the filter cake is removed, and the process repeated. These processes are in reality intermittent and the first portion of filtrate passing through before the filter cake is built up is not nearly as well clarified as the last portion passing through the thick filter cake. In the present process, since it is truly continuous, all the liquid is made to pass through the same thickness of filter bed.

The present process, besides differing in principle, differs from the usual filtration processes in the character of the filter cake produced. The solids, colloids, etc., removed from the suspension according to the present method, usually leave the apparatus in the form of a concentrated sediment approaching the character of a mud rather than a filter cake. In such cases, such as in the clarification of sugar juices, where the valuable component is found in the liquid, it is usually desirable to subject the mud from the present process to a usual filtration treatment to recover the last traces of liquid. In such cases, the present process can be considered as a so-called thickening process. When used as such, it has several advantages over the thickening processes of the prior art. Thus, the present process yields a more concentrated mud; requires less residence time; requires less floor space; produces a liquid of better clarity, and has other advantages when used for certain purposes.

The process of my invention may find application in many fields where the problem of separating solids, colloidal, mucilaginous material, etc., from liquids is encountered. Thus, for example, my process may find utility in the thickening of valuable pulps in ore dressing, in the manufacture of phosphoric acid, in water treating, in the clarification of wine, in yeast thickening, in molasses production, etc.

One suitable application of the process of my invention is in the clarification of sugar juices. In the manufacture of sugar, the clarification of the juices plays a very important part, the excellence of the product depending to a large extent upon the perfection attained in the clarification treatment. Not only are the appearance and purity of the sugar affected by the clarification treatment, but the keeping qualities of the liquors are much improved and the inversion and development of color are avoided by efficient clarification. The raw sugar juice is usually a slightly acid, complex solution of crystallizable and non-crystallizable sugars containing numerous organic and inorganic impurities such as albuminous matter, complex iron compounds, small pieces of vegetable fibre, protein matter, etc. Since the extremely gluey and clogging nature of many of the impurities makes it practically impossible to clarify the juice directly by filtration, it is the custom to coagulate and render the impurities insoluble as far as possible by the addition of lime and heating. After carbonation, the juices are allowed to settle in large vats, or callow tanks, or are fed to mechanical thickeners. The first of these methods, under favorable conditions, gives a mud amounting from 10 to 13 per cent of the height of the liquor in from 30 to 60 minutes and yields a juice of good clarity. The disadvantages of this settling method is the large storage capacity required and the relatively long time required for the juice to properly clarify which allows fluctuation in the pH value of the juices to take place. For the proper clarification of sugar juices the pH value must be accurately maintained at the desired value and for this reason it is desirable that the clarification step consume as little time as possible. Mechanical thickeners, since they afford a continuous and automatic treatment, have been adopted to a considerable extent but have several disadvantages. This method does not usually clarify the juice as perfectly as quiescent settling, require a residence time longer than would be desired, requires the use of more lime, and yields a less concentrated mud.

When properly applied, the process of the present invention permits the clarification of sugar juice in a shorter time, requires less floor space, and allows the production of a clarified juice of excellent limpidity.

The following description, considered with the accompanying drawing, illustrates an apparatus suitable for executing the process of my invention and particularly suitable for the clarification of sugar juices. I am aware, however, of the fact that the process of my invention may be executed in apparatus of numerous varying designs and I do not, therefore, desire my invention to be limited to the specific embodiments herein disclosed except as defined in the attached claims.

The figure represents a vertical central section of one form of apparatus suitable for employing the principles of my invention. The arrows indicate the direction of flow of the solid particle.

The apparatus consists of a vertically disposed cylindrical container 1 open at the top and fitted with three concentric conical partitions 2, 3, and 4. Although a circular cross section is perhaps more practical, the apparatus may be made square or of any other convenient cross section, if desired. The upper conical partition is fitted with an open sleeve 5 extending downward well into the next lower conical partition. A central, rotatable, hollow shaft 6 extends from the bottom of the lowest conical partition up through the second conical portion and the sleeve 5 to the top of the apparatus. The hollow shaft 6 is secured to a solid shaft 22 at the top. The solid shaft is connected to a suitable, preferably adjustable speed, driving mechanism (not shown). The hollow shaft 6 is provided with an opening 7 located near the bottom of the conical partition 3. A scoop paddle 8 attached to the shaft is so placed with respect to the opening that upon rotation of the shaft material in the conical partition 3 is scooped through the opening 7 into the hollow portion of the shaft 6. A second opening in the shaft is located above the top of the sleeve 5. This opening may be provided with a short nipple 21. The shaft is provided with three sets of paddles or stirrers 9, 10, and 11 placed just below the bottom of sleeve 5, just below the bottom of conical partition 3 and just above the bottom of conical partition 4, respectively. Outlets for clarified juice 12 and 13 are placed just below the intersections of the conical partitions 2 and 3 with the cylindrical outer wall 1. These outlets are preferably equipped with suitable valves 23 and 24. A spacious mud discharge outlet 14 equipped with a suitable valve 25 is situated near the bottom of the lowest conical partition. This mud outlet is preferably connected to a suitable mud discharge pump (not shown). A feed inlet pipe 15 runs up through the center of the shaft 6 and ends just below the hole and scoop paddle 7 and 8. A mud duct 16 leads from a point between conical partitions 2 and 3 at about the elevation of the top of sleeve 5 to a point near the center of the apparatus just below the bottom of conical partition 3. 17 and 18 represent windows in the apparatus.

The operation of the apparatus is as follows: the apparatus is filled by introducing the suspension to be separated via pipe 15 at the bottom and liquid (not necessarily clarified) is slowly drawn off via outlet 13 until a sediment layer builds up in conical partitions 3 and 4 to about the height of the dotted lines 19 and 20. The shaft is set in rotation and the apparatus allowed to sit without further charging of material until the liquid collected above the sediment (above the dotted lines 19 and 20 is of the desired clarity. The apparatus at this point is ready to operate.

The suspension to be clarified is introduced at a controlled, even rate via pipe 15. Upon discharging into shaft 6 it is mixed with a portion of sediment taken from the bottom of conical section 3 by means of scoop paddle 8. The suspension then discharges via nipple 21 into conical partition 2 wherein it degasses. The suspension then travels down via sleeve 5 into the lower part of conical section 3. The sediment layer extending from the bottom of conical partition 3 up to the interface (seen through the window 17) is in a static state of secondary settling. The clear liquor collecting above the sediment layer is continually drawn off via outlet 12. The excess sediment, (since the sediment layer is continually being renewed from the bottom) passes via mud duct 16 to well under the sediment surface 20 in the lower conical partition 4. In the lower portion the sediment undergoes further secondary settling. The clear liquid, separating at the top is continuously drawn off via outlet 13 and the concentrated sediment or mud is continuously removed via mud discharge pipe 14. The rotating paddles 9, 10, and 11 promote uniform composition of the sediment and prevent channeling.

As has been pointed out, the present process depends upon the maintenance of a static condition of secondary settling and the substantial absence of primary settling. Thus, under proper operating conditions, the supernatant liquid, even close to the liquid-sediment interface, is substantially free from suspended matter and no appreciable sediment is deposited on the sediment surface by primary settling. However, in a small zone near the point of introduction of the incoming suspension, the concentration of solids may fall below that required for a condition of secondary settling since the horizontal cross section of the sediment layer at this point is much smaller than at the sediment surface. This small zone of primary settling, if present, does not contribute to the clarifying action in any way and is not intended to be excluded by the term "substantial absence of primary settling."

For the proper operation of the above apparatus, certain conditions should be maintained. The height of the sediment layer in the upper partition 3 must be maintained above the inlet to the mud duct 16. The sediment level is seen through the window 17 and is adjusted by adjusting the discharge rate of clear liquor from the lower outlet 13. The desired concentration of the discharging mud is regulated by adjusting the height of the sediment layer in the lower partition 4 the mud becoming more concentrated as the height of the sediment layer is increased. The lower sediment layer should at all times be well above the outlet of mud duct 16.

In order to facilitate uniform continuous operation of my process, I have found it desirable, especially in the clarification of carbonated sugar juices, to maintain the solid content in the incoming feed at a fairly high concentration. This is accomplished in the described apparatus by recycling a portion of the more concentrated mud from the bottom of partition 3 by means of the hole and scoop-paddle arrangement. Another, and better method, is to mix a portion of the most concentrated mud from the last stage of the apparatus with the incoming feed prior to pumping to the apparatus. It should, however, be understood that the recycling features above disclosed are desirable improvements and that my process is likewise operative and useful without these features.

Numerous other modifications of the above apparatus may be made without departing from the spirit of my invention. For example, in most cases the problem of degassing is not present and the upper cone may then be dispensed with. For the clarification of very volatile liquids the apparatus may be completely closed and may operate under pressure, if desired. Instead of the simple two-stage apparatus shown, any number of stages may be added. Added stages are of advantage where it is desired to produce clarified liquids of different degree of clarity such as, for instance, where the more perfectly clarified liquid from an advanced stage has a limited demand and high value. Added stages will be simply further conical sections fitted with the proper mud ducts, clear liquid outlets, and stirring paddles placed above the lower partition 4 and below the first (upper) stage. Many other variations in detail, such as the introduction of the feed from the top, etc., may be made.

The conical partitions 3 and 4 are not precipitation surfaces in the usual sense of the word since primary settling does not take place and they are, furthermore, rather steeply inclined to the horizontal (at least 30°).

The effectiveness of the present method for clarifying sugar juices is illustrated by the following example. A 3 percent limed sugar juice containing a small amount of phosphate and 12.6 percent soluble material was carbonated. The carbonated juice having an alkalinity of pH 8.15 had a primary settling time for a 10-inch column of 15 min. and 5 sec. This material was clarified according to the present method. In 48 min. 30 sec. there were obtained 4 liters of excellently filtered clear juice and 0.95 liter of mud of about 40° Brix suspension. Since the net capacity of the apparatus was 4 liters, this corresponds to a residence time of only 39 min. In comparison, a carbonated juice having a primary settling time for 10-inch column of 5-6 min. requires a residence time of about 2 hours in the conventional mechanical thickeners to produce a juice of equal quality.

Another useful application of the present process is for the removal of finely divided particles of acid sludge, slow settling, flocculent precipitates, and similar undesirable materials from hydrocarbons, inorganic solvents, and the like. For this purpose the correct amount, found by experiment, of a suitable filter aid such as kiesel-guhr, salt, etc., may be suspended in the liquid to be clarified and the suspension treated as above described. For such treatment the degassing cone is unnecessary. The method has the advantages of being truly continuous and capable of operation under pressure without loss by vaporization.

I claim as my invention:

1. A concurrent multi-stage process for the clarification of liquids which comprises the continuously performed steps of introducing a liquid containing suspended matter at a point beneath an accumulation of its own suspended matter in a state of secondary settling, removing a clarified liquid from a quiescent zone above the level of the matter in a state of secondary settling, said quiescent zone being substantially devoid of primary settling, removing the upwardly moving solid matter as a mud from a point near and below the liquid-sediment interface, conducting said mud to a point in a second stage below a column of solid matter undergoing secondary settling, removing a supernatant clarified liquid resulting from said last mentioned secondary settling, and removing a mud of the desired concentration of solids from the bottom of said column of solid matter undergoing secondary settling.

2. A concurrent multi-stage process for the clarification of liquids which comprises the continuously performed steps of introducing a liquid containing a suitable concentration of suspended solid matter at a point beneath an accumulation of its own suspended matter in a state of secondary settling, removing a clarified liquid from a quiescent zone above the level of the matter in a state of secondary settling, said quiescent zone being substantially devoid of primary settling, removing the upwardly moving solid matter as a mud from a point near and below the liquid-sediment interface, conducting said mud to a point in a second stage below a column of solid matter undergoing secondary settling, removing a supernatant clarified liquid resulting from said last mentioned secondary settling, and removing a mud of the desired concentration of solids from the bottom of said column of solid matter undergoing secondary settling.

3. A concurrent multi-stage process for the clarification of liquids which comprises the continuously performed steps of introducing a liquid containing a suitable concentration of suspended solid matter at a point beneath an accumulation of its own suspended matter in a state of secondary settling, recycling a portion of said accumulation into the incoming feed, said recycled portion being taken from a point below the point of entrance of the incoming feed, removing a clarified liquid from a quiescent zone above the level of the matter in a state of secondary settling, said quiescent zone being substantially devoid of primary settling, removing the upwardly moving solid matter as a mud from a point near and below the liquid sediment interface, conducting said mud to a point in a second stage below a column of solid matter undergoing secondary settling, removing a supernatant clarified liquid resulting from said last mentioned secondary settling, and removing a mud of the desired concentration of solids from the bottom of said column of solid matter undergoing secondary settling.

4. A concurrent multi-stage process for the clarification of liquids which comprises the continuously performed steps of introducing a liquid containing a suitable concentration of suspended solid matter at a point beneath an accumulation of its own suspended matter in a state of secondary settling, said incoming suspension having been admixed, previous to introduction with a portion of concentrated sediment, removing a clarified liquid from a quiescent zone above the level of the matter in a state of secondary settling, said quiescent zone being substantially devoid of primary settling, removing the upwardly moving solid matter as a mud from a point near and below the liquid-sediment interfere, conducting said mud to a point in a second stage below a column of solid matter undergoing secondary settling, removing a supernatant clarified liquid resulting from said last mentioned secondary settling, and removing a mud of the desired concentration of solids from the bottom of said column of solid matter undergoing secondary settling.

5. A concurrent multi-stage process for the clarification of liquids which comprises the continuously performed steps of degassing a liquid containing a suitable concentration of suspended solid matter in an open-topped conical vessel, conducting said degassed suspension from the bottom of said conical vessel to a point beneath an accumulation of its own suspended matter in a state of secondary settling, removing a clarified liquid resulting from said secondary settling, and removing a mud of the desired concentration of solids from the bottom of the accumulation of its own suspended matter undergoing secondary settling.

6. In an apparatus for clarifying liquids, the combination of a vessel having a conical bottom, the apex of which projects downwardly towards the central vertical axis through the apparatus, means for centrally introducing a suspension to be clarified into said vessel and near its bottom, stirring means situated near the bottom of the vessel and adapted to prevent channeling of said suspension, means for removing a concentrated mud from a peripheral point of said vessel above the point of introduction of the suspension, and means for removing the clarified liquid at a point above that at which the concentrated mud is withdrawn and relatively closer to the peripheral top of the vessel.

7. An apparatus for clarifying liquids which comprises a vessel having an inverted conical bottom inclined downwardly towards the center of said vessel, means for centrally introducing a suspension to be clarified into said vessel and near its bottom, means communicating the interior of the vessel and the first-mentioned means adapted to recirculate a portion of the suspension from the bottom of the vessel into the incoming suspension, means at a peripheral point above the level of the point of suspension introduction adapted for removing a concentrated mud from said vessel, and means for removing a clarified liquid from a point above the level of withdrawal of concentrated mud.

8. In an apparatus for clarifying liquids, the combination of two superimposed vessels each having conical bottoms projecting downwardly towards the center of the apparatus, communicating means between said vessels disposed near the lower end of the bottom of the upper of said vessels, means for introducing a suspension to be clarified into the upper vessel, means for removing a concentrated mud from a peripheral point on said lower vessel above the bottom of the upper vessel, and means for removing a clarified liquid from the upper portion of the lower vessel.

9. In an apparatus for clarifying liquids, the combination of two superimposed vessels having conical bottoms, means for introducing the suspension to be clarified into the upper vessel near the bottom, means for conducting a concentrated mud from a point above the point of introduction of the suspension in the upper vessel to a point near the center of the lower vessel below the bottom of the upper vessel, means for removing concentrated mud from a point near the bottom of the lower vessel, and means for removing clarified liquid from points near the tops of both vessels.

10. In an apparatus for clarifying liquids, the combination of a plurality of superimposed vessels having conical bottoms, means for introducing a suspension to be clarified near the bottom of the uppermost vessel, means communicating each succeeding pair of adjacent vessels adapted to conduct a concentrated mud, from a point above the point of suspension introduction into the respective upper vessel, to a point near the center of the next succeeding lower vessel and below the bottom of such upper vessel, and means for removing a concentrated mud from a point near the bottom of the lower vessel.

11. A structure according to claim 10, wherein means are provided for the removal of clarified liquids from points near the tops of said superimposed vessels.

GEORGE E. G. von STIETZ.